Sept. 23, 1941.    A. B. MERRILL    2,256,647
BEARING
Filed July 24, 1940
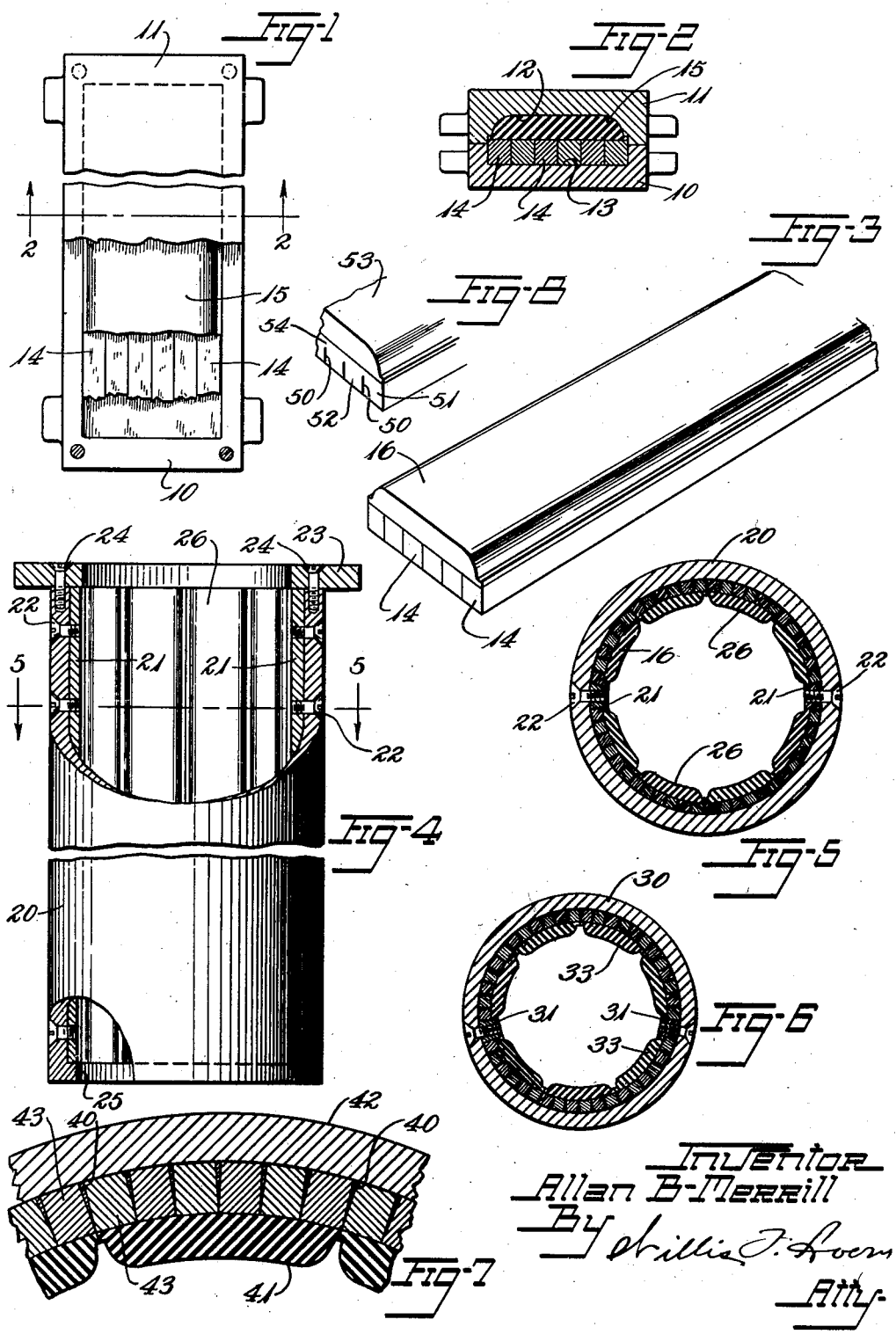
Inventor
Allan B. Merrill
By Willis J. Loern
Atty.

Patented Sept. 23, 1941

2,256,647

UNITED STATES PATENT OFFICE 2,256,647

BEARING

Allan B. Merrill, Akron, Ohio, assignor to The B. F. Goodrich Company, New York, N. Y., a corporation of New York Application July 24, 1940, Serial No. 347,209

8 Claims. (Cl. 308—238)

This invention relates to bearings for relatively movable machine elements and more particularly to bearings having a bearing surface of resilient rubber-like material suitable for aqueous fluid lubrication.

Heretofore bearings having a bearing surface of rubber-like resilient material for rotatable shafts and other rotatable machine elements have been made, according to one procedure, by molding rubber-like material within a circular bushing of metal and vulcanizing or bonding the rubber to the metal. This method has had disadvantages due to the difficulty of successfully bonding the rubber where it was necessarily introduced from an end of the bushing and was wiped across the metal surface in entering the bushing. This difficulty increased directly with the length of the bushing. Further, it has been necessary to form the bearing surface by use of a mandrel and the method has been restricted to bearing types in which the mandrel could be removed endwise from the finished bearing. The manufacture of bearings by this method also has necessitated the stocking of bushings in a great number of sizes and dimensions, and investment in a great number of molds of different sizes.

To overcome some of these difficulties it has been proposed to form the bearing in sections, each section comprising a metal or hard rubber strip curved in cross-section and having a resilient bearing surface of rubber-like material bonded to one curved face thereof and the strips or sections being assembled within a metal sleeve or bushing. While this method has permitted more variation in arrangement of the bearing lands and lubricant grooves, it also has required extra cost of machining of the metal strips or sections and has required numerous special molds for strips of different curvatures, widths, and lengths.

The principal objects of the invention are to provide an improved bearing construction and procedure for making the same, overcoming objections to prior constructions and procedures, and more especially to provide a rubber bearing with a backing of substantial thickness and strength that may be made in the flat and is nevertheless conformable to housing sleeves of varying degrees of curvature.

A more specific object is to provide a rubber bearing section backed by a metal layer divided throughout the thickness of such layer, as by through cuts or slits extending partly through it, or such divided layer may be provided by metal strips arranged side by side, to the end of ready bendability and conformability of the metal layer to housing sleeves of varying degrees of curvature, provided by such divided construction.

These and other objects will appear from the following description and the accompanying drawing.

Of the drawing

Fig. 1 is a plan view of a mold with a bearing member therein, parts of the mold and parts of the bearing member being broken away.

Fig. 2 is a cross-sectional view thereof, taken on line 2—2 of Fig. 1.

Fig. 3 is a perspective view of a bearing member as removed from the mold of Fig. 1, the bearing member being constructed in accordance with and embodying the invention.

Fig. 4 is a side elevation of an assembled bearing embodying the invention, parts being broken away.

Fig. 5 is a cross-sectional view thereof, taken on line 5—5 of Fig. 4.

Fig. 6 is a view like Fig. 5 showing the bearing member mounted in a bushing of smaller circumference and therefore greater curvature.

Fig. 7 is a sectional view on an enlarged scale showing a portion of a modified construction, parts being broken away.

Fig. 8 is a view like Fig. 3 showing a further modified construction.

In accordance with one form of the invention each bearing section is formed from a plurality of flat strips of metal or other relatively inflexible backing material arranged close together in parallel relation providing the divided construction. A bearing surface of resilient rubber-like material is bonded to one face of the group of strips and is molded to the desired form of bearing lands and lubricant grooves in a flat mold. After vulcanization and molding are complete the arrangement provides a flexible bearing surface with parallel strips bonded to the back surface thereof in edge-to-edge relation. Due to this arrangement the strips are hinged to each other by the rubber material and the bearing member may be bent to any desired curvature and retained by mounting it upon a suitable curved surface. In one form of this invention the spaces between the metal strips are filled with solder or other material of low melting point and may be thereby secured to each other at the desired curvature of the bearing surface. Only flat molds are required and the strips may be of standard dimensions of rolled, drawn or extruded metal. The molded bearing members may be of standard width and assembled in bushings of different circumferences by using suitable filler pieces therebetween, where needed.

Referring to the drawing, the numeral 10 designates the lower plate and 11 the upper plate of a flat mold. The upper plate has a molding surface 12 formed to the desired land and groove arrangement for the bearing required, while the bottom mold plate has a flat surface 13 adapted to support a group of backing strips 14, of metal, or other relatively inflexible material, of square or rectangular cross-section. A body of rubber 15 is placed in the mold, and is molded to the desired surface contour and bonded by vulcanization to the strips 14. The resulting bearing member is shown in Fig. 3 and comprises a flat land 16 of resilient bendable rubber material and a plurality of stiff backing strips 14 of metal arranged in abutting parallel relation with one face of each strip bonded to the rubber. Prior to insertion in the mold, the strips may each be prepared for bonding on one face thereof as by being electroplated or otherwise coated with an alloy of copper and zinc or by coating them with a bonding material, such methods of promoting a good bond being well known in the art of rubber working. Other surfaces of the strips may be treated, as by a coating of cellulose lacquer or other material to prevent bonding of the rubber.

The finished bearing member shown in Fig. 3 may be arched laterally by flexing the rubber-like material to spread the strips apart at their unbonded contiguous faces. A plurality of the bearing members may be assembled in abutting relation within the bore of a bushing 20 as shown in Figs. 4 and 5, and held in place in arched relation by means such as strips 21 and screws 22, the strips 21 being of such width as to complete the circumference of the bushing. Means, such as collar 23 secured to one end of the bushing 20, as by screws 24, and a shoulder 25 at the other end of the bushing, may be employed to hold the bearing members in place axially of the bearing. The arching of the bearing member places the rubber bearing surface under compression which is desirable as rubber under compression has a high resistance to abrasion.

By making the bearing members of a standard width, they may be fitted in a variety of sizes of bushings as for example in Figs. 5 and 6 when the bearing members 26 and 33 are the same width but six bearing members 26 are employed in the bushing 20 of Fig. 5 and five members 33 are employed in the bushing 30 of Fig. 6. The strips 21 of Fig. 5 and 31 of Fig. 6 which make up any difference in arcuate extent of bushing and assembled bearing members may be fitted accordingly and are usually much less in width than the bearing members. As many strips 21 or 31 may be employed as there are spaces between the bearing members, thereby distributing the spacing. This construction greatly reduces the required number of molds for the bearing members as one mold will provide bearing members for a great number of sizes of bushings.

After the rubber bearing surface has been attached to the metal strips 43, the spaces between the strips formed by arching of the bearing member 41 to fit the bushing 42 may be filled if desired with fillings 40 of material having a fusing point below the vulcanization temperature of the rubber-like material, as shown in the embodiment of Fig. 7. For this purpose a metal of low melting point, such as solder may be used and the spaces not only filled, but the strips 43 may be united by the solder so that the bearing member is held permanently in arched condition with its rubber bearing surface under compression.

Instead of a plurality of strips to provide the divided backing, such divided construction may be provided as by slitting a solid piece of metal either entirely throughout its thickness so that it will appear like the construction of Fig. 3 of strips placed side by side, or by providing a slitted or otherwise partly separated metal backing as in the embodiment of Fig. 8 in which slits 50, 50 in a metal piece 51 provide a readily bendable layer of divided construction comprising strips 52 hinged to each other at the bottoms of the slots. The metal backing may be slitted either before it is placed in the mold or after the bearing element 53 has been bonded thereto. In this construction the rubber-like material of the bearing element is prevented from spewing between the strips by the thin unslitted portion 54 of the metal layer.

The invention permits the making of a great many sizes of bearing members by use of a single size of backing element. The resulting article may be arched to any desired curvature. The use of bearing members of standard width reduces the number of molds required and permits use of one width in bearings of different sizes and curvatures. The molding of the bearing members in flat shape, simplifies the construction of molds and the procedure of molding the members, and permits the use of lubrication grooves and bearing lands of any shape, such for example as straight, curved or spiral. The filling of the spaces between the strips 14 provides a rigid structure which may be handled as a unit without material change of curvature.

Variations may be made without departing from the scope of the invention as it is defined by the following claims.

I claim:

1. A bearing member comprising a bearing element of rubber-like material, and a backing structure secured to said element, said backing structure being of relatively stiff material and being divided to provide bendability thereof.

2. A bearing member comprising a bearing element of rubber-like material, and a backing structure secured to said element, said backing structure comprising a relatively thick layer of stiff material divided by slits extending at least partly through said layer providing bendability of the layer by virtue of the divided construction.

3. A bearing member comprising a bearing element of rubber-like material, and a backing structure secured to said element, said backing structure comprising a relatively thick layer of metal divided by slits extending at least partly through said layer providing bendability of the layer by virtue of the divided construction, and said bearing element being vulcanized to said layer of metal.

4. A bearing member comprising a bearing element of rubber-like material, and a plurality of relatively stiff backing elements each secured to the same surface thereof and contiguous to each other.

5. A bearing member comprising a flexible resilient bearing element of rubber-like material, and a plurality of relatively stiff backing elements each secured to the same surface thereof providing a divided backing, said bearing element being adapted to be arched by virtue of the bendability afforded by the divided backing.

6. A bearing member comprising a flexible resilient bearing element of rubber-like material, and a plurality of relatively stiff backing elements each secured to the same surface thereof in side by side relation to each other, said bearing element being arched in a direction perpendicular to contiguous faces of said backing elements, and a filling between said backing elements to hold said bearing element in arched condition.

7. A bearing member comprising a flexible resilient bearing element of rubber-like material, and a plurality of relatively stiff backing elements each secured to the same surface thereof in side by side relation to each other, said bearing element being arched in a direction perpendicular to contiguous faces of said backing elements, and said backing elements being secured to each other with said bearing element in its arched condition.

8. A bearing member comprising a flexible resilient bearing element of rubber-like material, and a plurality of relatively stiff backing elements each secured to the same surface thereof in side by side relation to each other, said bearing element being arched in a direction perpendicular to contiguous faces of said backing elements, and fillings of metal in the spaces between the contiguous faces of said backing elements and bonded thereto, said fillings maintaining said bearing element in its arched relation.

ALLAN B. MERRILL.